United States Patent [19]

Kummer

[11] 4,034,451

[45] July 12, 1977

[54] TURNING TOOL WITH A CUTTING TIP

[76] Inventor: Pierre Kummer, 2720 Tramelan, Switzerland

[21] Appl. No.: 646,233

[22] Filed: Jan. 2, 1976

Related U.S. Application Data

[63] Continuation of Ser. No. 491,507, July 24, 1974, abandoned.

[30] Foreign Application Priority Data

July 31, 1973 Switzerland ............... 11183/73

[51] Int. Cl.² .................................... B26D 1/00
[52] U.S. Cl. .................................. 29/96; 76/101 R
[58] Field of Search ............. 29/96, 98; 76/101 A, 76/101 R

[56] References Cited

U.S. PATENT DOCUMENTS

| 1,104,980 | 7/1914 | Fry .................................. 29/98 |
| 1,282,984 | 10/1918 | Thompson ........................ 29/98 |
| 3,500,523 | 3/1970 | Cashman et al. ................ 29/96 |
| 3,613,485 | 10/1971 | Kelly et al. .................... 76/101 A |

FOREIGN PATENT DOCUMENTS

| 78,505 | 7/1955 | Netherlands ................... 29/96 |
| 291,276 | 6/1953 | Switzerland .................... 29/96 |

*Primary Examiner*—Leonidas Vlachos
*Attorney, Agent, or Firm*—Marshall & Yeasting

[57] ABSTRACT

A turning tool comprises a shank and a separate extension member to which a cutting tip is attached. The extension member has at its rear side a convex cylindrical surface which extends over an arc of approximately 180° and to which the sidewalls are tangent. That surface is brazed, welded or fixed by an adhesive to a concave cylindrical surface provided at the front end of the shank.

8 Claims, 14 Drawing Figures

TURNING TOOL WITH A CUTTING TIP

This is a continuation of application Ser. No. 451,507 filed July 24, 1974 and now abandoned.

BACKGROUND OF THE INVENTION

This invention relates to a turning tool having a cutting tip attached to the front end thereof.

Turning tools are known where the cutting tip is permanently attached to the front end of a shank of the tool body, e.g., by brazing. In by far the most cases, however, the cutting tip is detachably fixed to the front end of the shank so that it may be successively used in different positions as a so-called reversible cutting tip.

Cutting tips are to be found on the market which differ from one another in their shape (e.g., rhombic, triangular, etc.) and/or in their cutting angle. On the shanks or tool bodies, not only must the front part be prepared so that it can receive a cutting tip of a particular type to be fixed permanently or detachably, but in a first group of tools, this front part must extend straight out in the line of prolongation of the shank, while in another group of tools, the central plane of the front part must form an angle of between 90° and 180° with the central plane of the shank in order for the tools to be suitable for different turning operations and/or so that a tool with a "right-handed head" or a "left-handed head" may be obtained.

It follows from these requirements that not only the manufacturers of such tools but also the wholesalers are obliged to produce and stock, respectively, an enormous number of the most varied tools, some of which are very much in demand, while others are not much in demand. The storage costs are naturally added to the cost of manufacture.

It has therefore been sought to design a turning tool in such a way that the costs of manufacture and storage can be reduced by making it more efficient. U.S. Pat. No. 3,500,523 teaches a tool holder in which a tool bit is held in a correspondingly shaped recess of a carrier. The carrier, the tool bit, and the parts serving to clamp the tool bit to the carrier rest on the front end of the tool holder body in a suitably shaped recess thereof. The plate-like carrier rests on the base of this latter recess and has at its rear an arcuate, inclined wall which may be brazed at each end to a matching wall of the recess. A pin, coaxial with the aforementioned acruate, inclined surfaces and secured to the body, is provided as a pivot for the carrier prior to its being brazed to the body. Although this patent proposes the manufacture in large groups, of identical bodies and identical carrier parts, i.e., assemblies comprising a carrier, tool bit, and associated clamping means propose the fitting of each such assembly in rotatingly adjustable orientation on the base of the recess in the body, and finally its fixing to the body by spots of brazing an expedient rotating adjustment cannot actually take place to any significant extent with the design shown. The more the carrier is rotated out of the position in which it occupies the recess in the body completely, as viewed from above, the more it will project out of its recess to one side or the other of the body. This will have an unfavorable weakening effect in several respects. There will be increasingly less contact surface between the carrier and the base of the body recess, eccentricity of the application of force, and increasingly less place, or finally none at all, for spots of brazing on the projecting portion. With respect to the relative positions of the tool and the workpiece, too, impossible conditions may be brought about where the body would come into conflict with the workpiece.

The prior art also includes the turning tool taught by German Published Application No. 1,294,781. There an insert part comprising a cutting insert is brazed or soldered along slanting up towards the front and down towards the front to the front end of the tool shaft; one or both of these surfaces are provided with shims so that the cutting insert, when detached from the tool shank, can be brought back into its previous position after the regrinding of the top and front faces. This disclosure, however, teaches nothing which contributes toward alleviating the aforementioned drawbacks of the prior art.

SUMMARY OF THE INVENTION

It is the object of the present invention to eliminate these drawbacks by providing a design for a turning tool which is particularly suitable for the efficient manufacture and stocking of main parts for many turning tools, ensuring the possibility of assembly on short notice of the most varied types of turning tools, if only because it enables the front end of the tool to be positioned at greatly differing angles to the body or shank.

To this end, the turning tool according to the present invention comprises a shank, a separate extension member, and a cutting tip attached to the extension member, the extension member being of substantially the same height and width as the the shank, the front end of the shank forming a concave cylindrical surface, the rear side of the extension member forming a convex cylindrical surface extending over an arc of approximately 180°, and the sidewalls of the extension member forming surfaces tangent to the convex cylindrical rear surface, the extension member being brazed, welded, or fixed by an adhesive over the entirety of its convex rear surface to the concave end surface of the shank.

It will be obvious that besides the possibilities of efficient manufacture and stocking, other advantages result as well because the tool shanks may be very easily and simply produced as sections of long steel rods of rectangular or square cross-section. such sections need merely be finished with a concave cylindrical surface at one end. In certain cases, as will be seen later from the drawings, a plane surface may adjoin the concave surface at a tangent if it is desired to produce a turning tool with a head at a pronounced angle to the shank; if such a plane surface is needed, it may be produced just before affixing a tool head to the shank whenever a customer asks for a turning tool with an angled head.

The design provided by the present invention also contributes to an unobstructed flowing off of the turnings and chips provided that the tool head as such is already favorably designed in this respect. There are many known devices for detachably affixing the cutting tip to the tool which meet this requirement. Another such device is disclosed in the present specification; and although it does not form part of the present invention, it will be briefly described below with reference to FIGS. 1 and 2 of the drawings.

Other objects and advantages of the invention will become apparent from the following detailed description of preferred embodiments thereof, taken in conjunction with the accompanying drawings;

DESCRIPTION OF THE PERFERRED EMBODIMENTS

Figure 1:
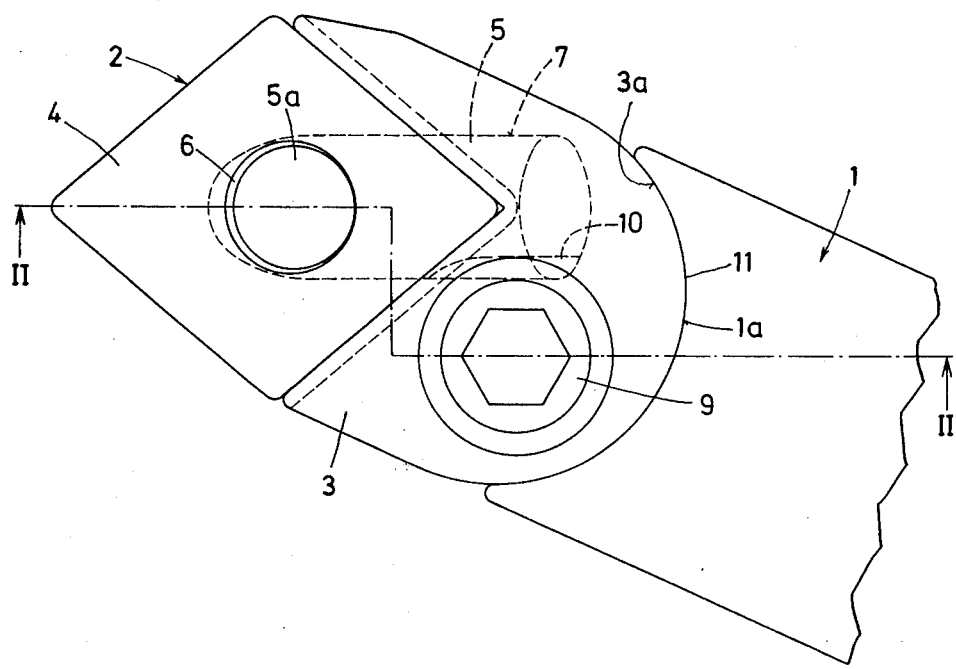
FIG. 1 is a top plan view of a first embodiment of the turning tool according to the invention, the tool head being equipped with a cutting tip of rhombic shape.
Figure 2:
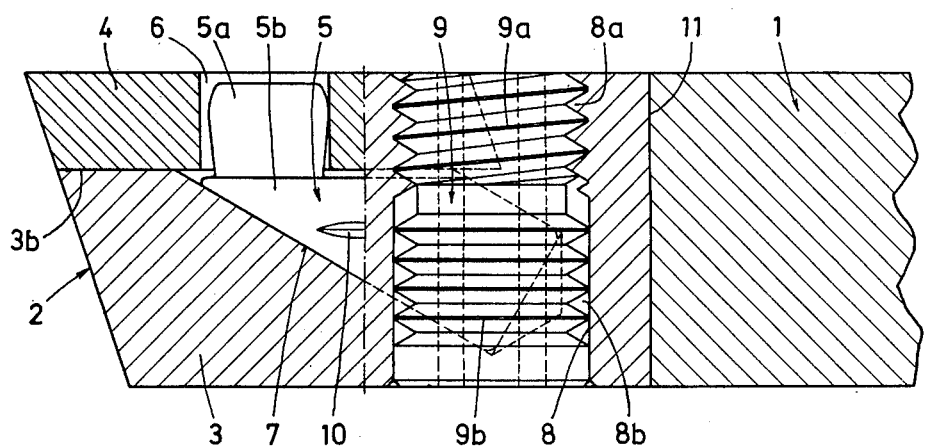
FIG. 2 is a section taken on the line II—II of FIG. 1, FIGS. 3 to 6 are top plan views of heads similar to that of FIGS. 1 and 2 but equipped with cutting tips of other shapes.

The turning tool illustrated in FIGS. 1 and 2 comprises a tool body, the main part of which is a shank 1 consisting of a section of a rod which will usually be rectangular in cross-section, less often square. This turning tool further comprises a head consisting of a number of elements collectively designated as 2. The head 2 comprises an extension member 3, which is attached to the shank 1 in a manner to be described below in detail, and means for detachably affixing a cutting tip 4 to the extension member 3.

In the present example these means consist of a device, in which a clamping head 5a of a clamping stud 5 acts upon the wall of a central aperture 6 in the cutting tip 4, while a cylindrical shaft 5b of the clamping stud 5 is displaceable in a blind hole 7 in the extension member 3. The extension member 3 also has a stepped bore 8, the narrower portion of which has an internal thread 8a in which a threaded protion 9a of a control screw 9 operates; in a further portion 8b of the bore 8, the control screw 9 has a plurality of annular grooves which alternate with annular ribs 9b. In a zone in which the bore portion 8b intersects the blind hole 7, the annular ribs 9b cooperate like rack teeth with tangential helical teeth 10 on the shaft 5b of the clamping stud. Thus by actuating the control screw 9, the clamping stud 5 can be displaced in the blind hole 7 in either direction, thus clamping or releasing the cutting tip 4. Is is emphasized, however, that the present invention is in no way limited to the use of a head 2 equipped with this particular clamping device.

The extension member 3 (which forms part of the head 2) is fixed to the shank 1 at 11 in that a convex cylindrical surface 3a at the rear of the extension member 3 is secured, preferbly by brazing, possibly by welding or by an adhesive, to a concave cylindrical surface 1a, having the same radius of curvature, at the front end of the shank 1. Where an adhesive is used, it will preferably be an epoxy resin, for example, in order to obtain a strong bond.

Figure 4:
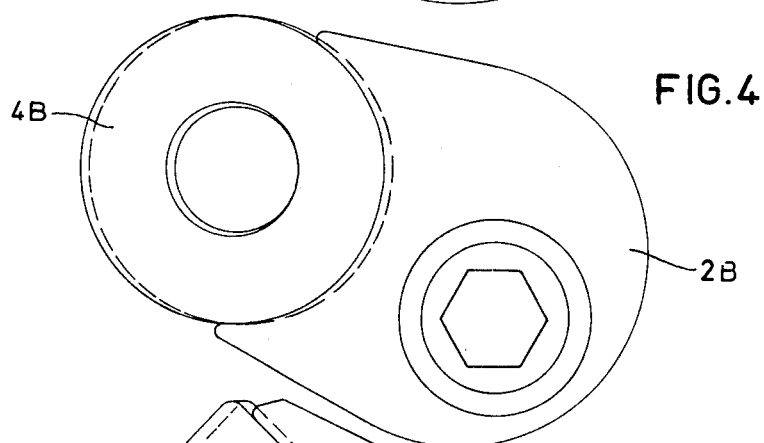
Figure 5:
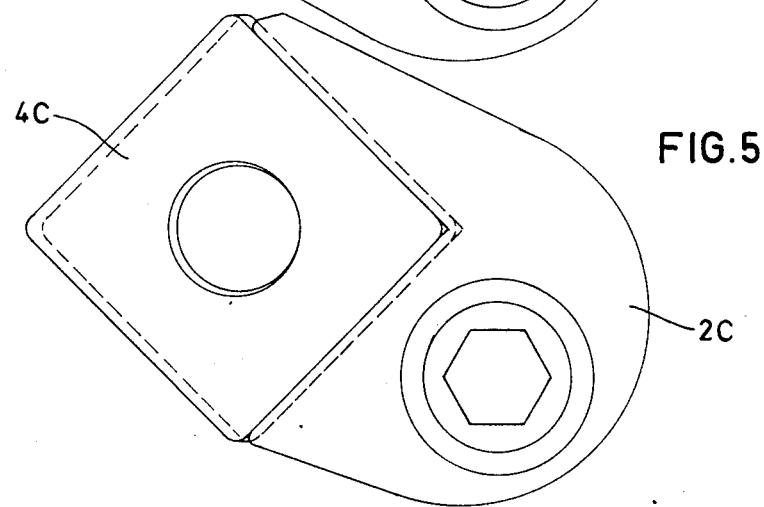
Figure 6:
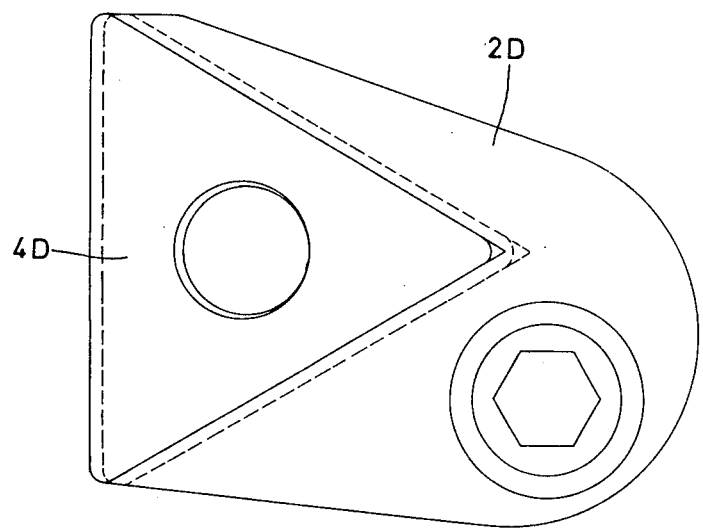
Figure 7:
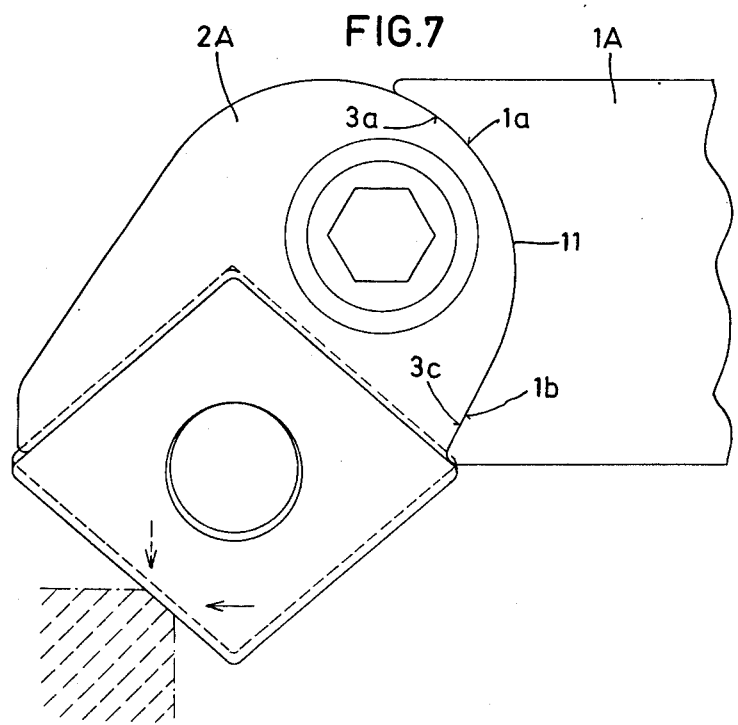
FIGS. 7 to 12 are top plan views of turning tools all having heads according to FIG. 3, but where the positions assumed by these heads with respect to the shank are different in each instance; these FIGURES indicate the types of turning operations which may be performed with the respective tools.
Figure 8:
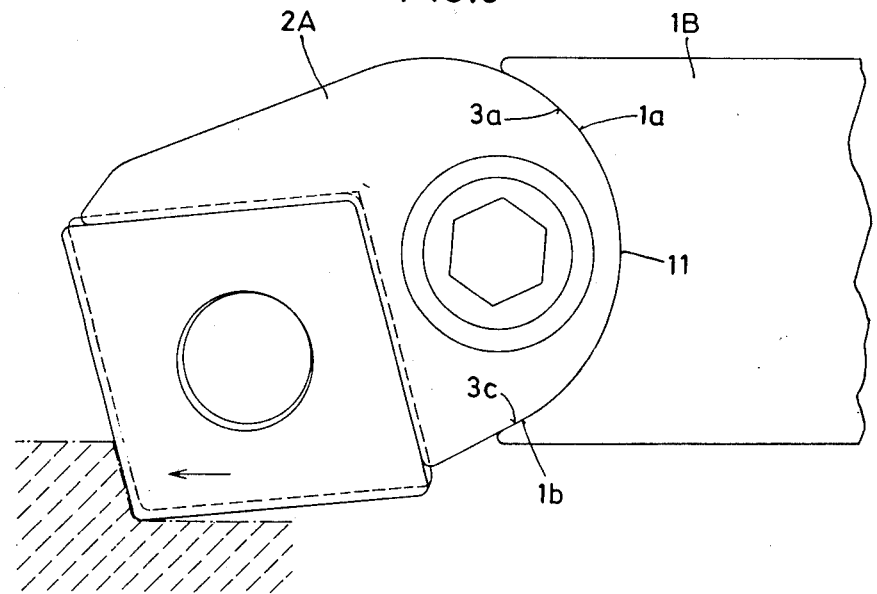
Figure 9:
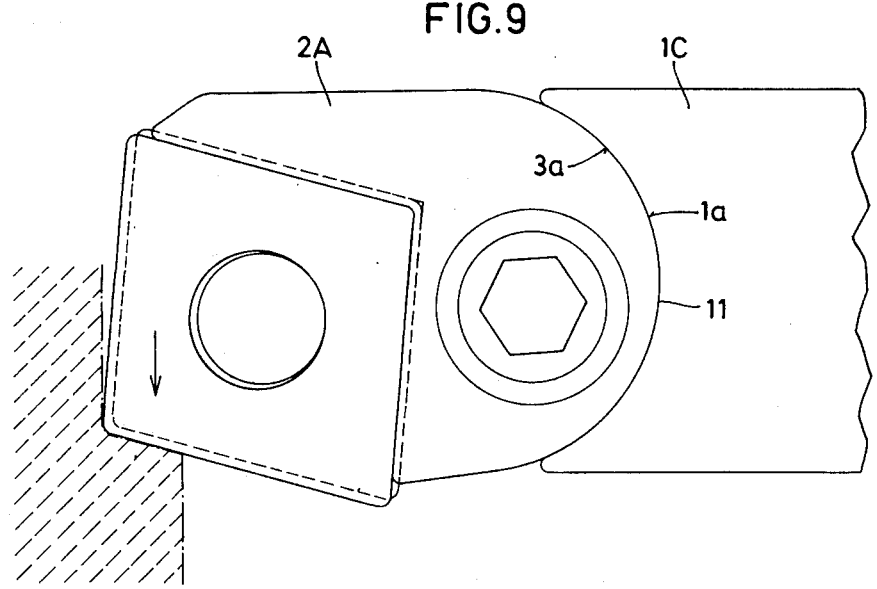
Figure 10:
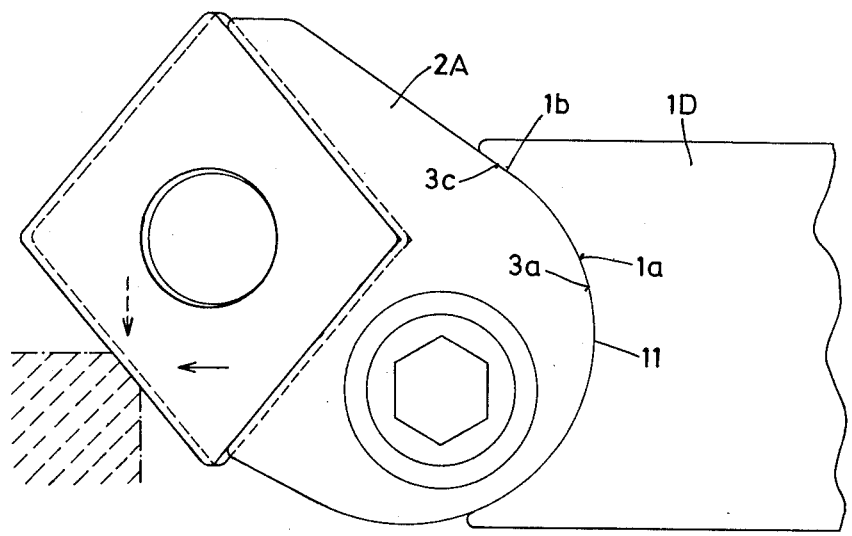
Figure 11:
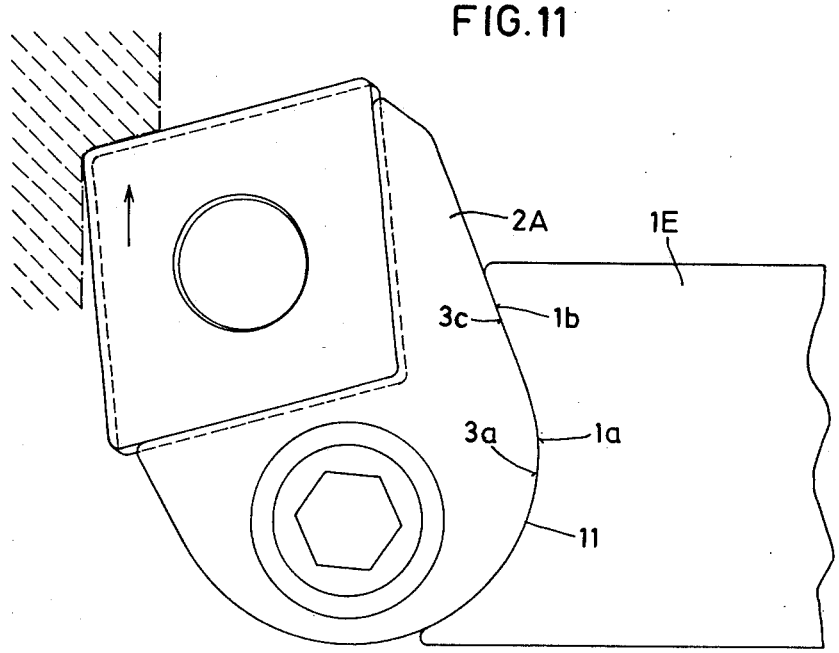
Figure 12:
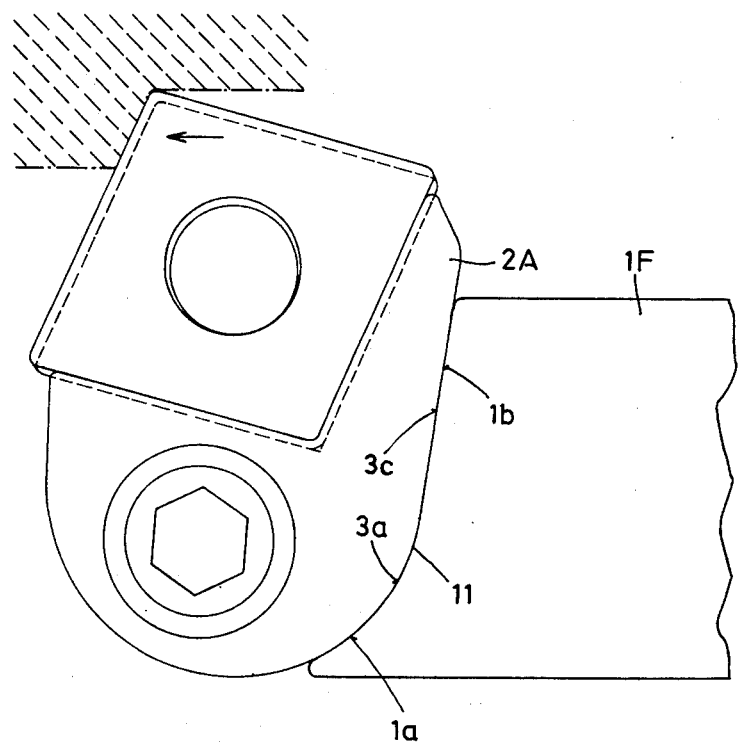

For producing an assortment of turning tools of the same type as that described above, one or more series of shanks 1 and or more series of heads are prefabricated, whereafter each prefabricated head (i.e., its extension member 3) is fixed to a shank 1 as described above. A series of heads will, for example, comprise a head such as the head 2 of the turning tool illustrated in FIGS. 1 and 2, further a head 2A with a rhombic cutting tip 4A as in FIG. 3, a head 2B with a circular cutting tip 4B as in FIG. 4, a head 2C with a square cutting tip 4C as in FIG. 5, and a head 2D with a triangular cutting tip 4D as in FIG. 6. For various nominal sizes of the cutting tips, corresponding sizes of the heads, i.e., of the extension members 3, and also corresponding sizes of the shanks 1, will be used. The heads may also differ from one another according to still other criteria; for instance, the support surface 3b (FIG. 2) for the cutting tip may be inclined at an angle of a few degrees in one direction or the other as compared with the position shown in FIG. 2. A series of shanks 1 may therefore be associated with one or more series of heads.

Figure 3:
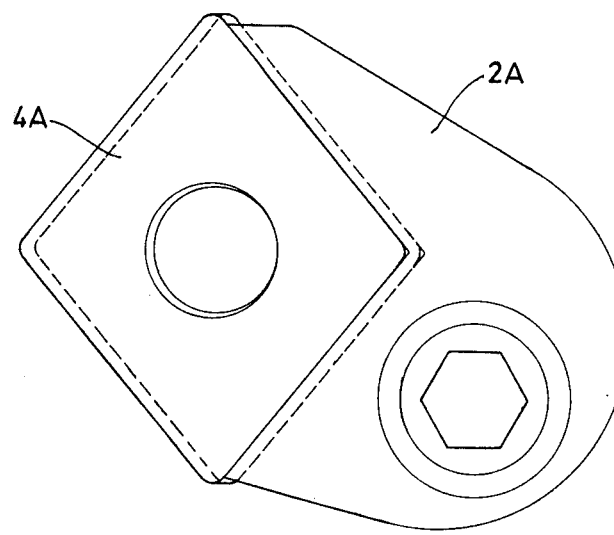

FIGS. 7 to 12 illustrate by way of example a series of turning tools produced by fixing prefabricated heads, such as the head 2A of FIG. 3, at different angles along 11 to a shank 1A, 1B . . . or 1F. Here it will be noted that in the case of certain shanks, e.g., the shanks 1A, 1B, 1D, 1E, and 1F, a plane surface 1b adjoins the concave cylindrical surface 1a at a tangent. The plane surface 1b is also brazed, welded, or secured by an adhesive along 11 to a lateral plane surface 3c which adjoins the convex cylindrical surface 3a at a tangent; such a surface 1b is obviously necessary for turning tools having a head at a sharp angle to the shank.

In FIGS. 7 to 12, dot-dash lines indicate portions of the contours of workpieces, and arrows indicate the direction of feed of the tool, in order to illustrate the types of turning operations which may be carried out with the various turning tools.

It will be obvious that the heads 2, 2B, 2C, and 2D may also be secured at various sharp angles to suitably selected shanks 1, 1A, to 1F.

Figure 13:
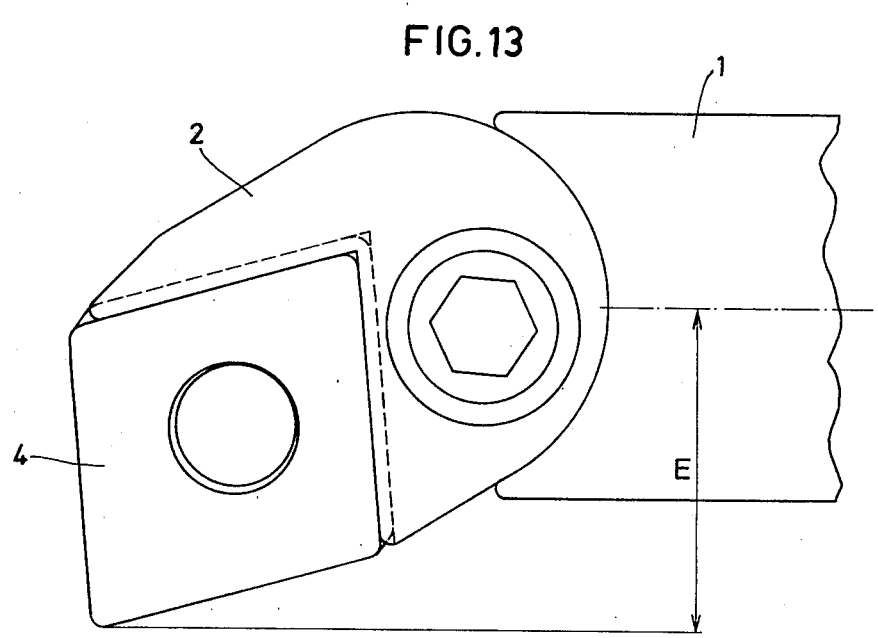
FIG. 13 is a top plan view of a turning tool with the same tool head as in FIG. 1 but in a different position with respect to the shank, so that a turning tool with a so-called "right-handed head" is produced.
Figure 14:
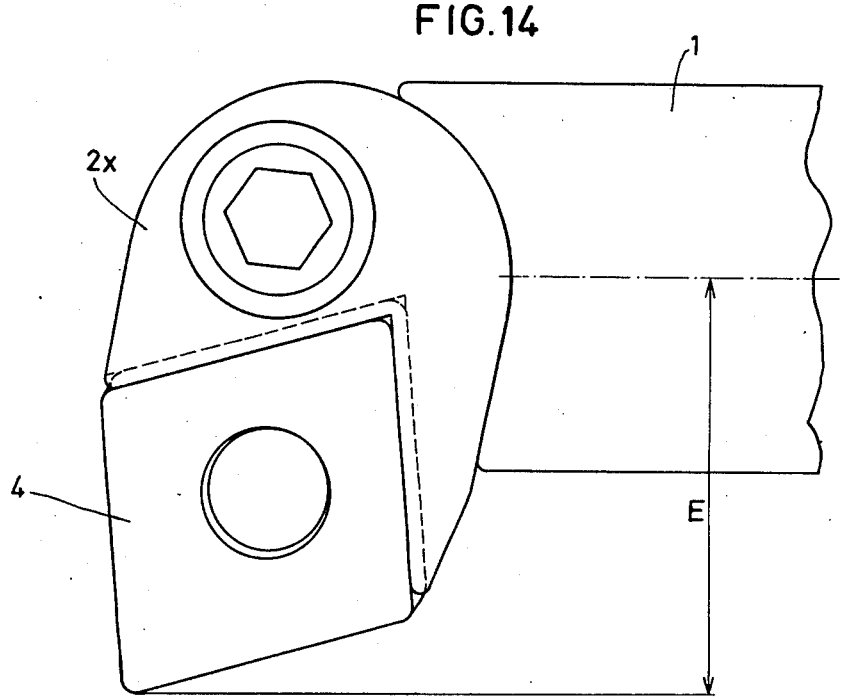
FIG. 14 is a top plan view of a turning tool with a head similar to that of FIG. 13, but "reversed", so that a turning tool with a so-called "left-handed head" is produced.

FIGS. 13 and 14 show two turning tools having heads 2 and 2x, respectively, of the same type as the head 2 shown in FIG. 1. The turning tool of FIG. 13 is one with a so-called "right-handed head", whereas that of FIG. 14 is one with a so-called "left-handed head". It will be seen that the distance between the working corner of the cutting tip and the longitudinal axis of the shank, designated as E, is considerably less in the case of the tool shown in FIG. 13 as compared with that of FIG. 14. The one or the other of these turning tools will be preferred according to the type of turning operation to be carried out.

It will be clearly seen that starting from tool shanks such as 1, 1A to 1F, and from heads such as 2, 2A, 2B, 2C, 2D, turning tools of the most varied types can be produced very quickly, some of them only upon special order, if so desired.

An important point is that all of these turning tools make it easily possible for the turnings and chips to flow off because they have no shoulders which might hinder such a flow.

What is claimed is:

1. A turning tool having an integrally bonded tool body, said tool body comprising a shank having a concave cylindrical end face extending over an arc of not more than 180° whose radius is substantially equal to one-half the width of the shank and whose height is equal to the height of the shank, a cutting tip-holding head having a convex cylindrical rear end face of the same radius as said concave face, and having a width equal to twice said radius and a height equal to the height of said convex surface, and a bonding material which integrally connects said convex end face to said concave end face to form an integral tool body, the only contact between the head and the shank being at said bonded end faces.

2. A turning tool according to claim 1 wherein the head comprises means within the head for releasably holding a cutting tip.

3. A turning tool having an integrally bonded tool body, said tool body comprising a shank having an end face which comprises a concave cylindrical surface extending over an arc of not more than 180° whose radius is substantially equal to one-half the width of the shank and whose height is equal to the height of the shank, and which also comprises a flat surface tangent to the cylindrical surface, a cutting tip-holding head having a convex cylindrical rear end face of the same radius as said concave face, and having a width equal to twice said radius and a height equal to the height of said convex surface, and a bonding material which integrally connects said convex end face to said concave end face and connects said flat surface to a side of the head to form an integral tool body, the only contact between the head and the shank being at said bonded surfaces.

4. A method of manufacturing an assortment of turning tools each comprising a tool body for holding a cutting tip, comprising the steps of prefabricating a plurality of identical shanks, each having a concave cylindrical end face extending over an arc of not more than 180° whose radius is substantially equal to one-half the width of the shank and whose height is equal to the height of the shank, prefabricating a plurality of identical cutting tip-holding heads, each having a convex cylindrical rear end face of the same radius as said concave face, and each head having a width equal to twice said radius and a height equal to the height of said convex surface, and integrally bonding the convex end face of each head in the concave end face of one of said shanks, the only contact between the head and the shank being at said bonded end faces, and the heads being set in a variety of positions angularly displaced from one another.

5. A method according to claim 4 wherein each head comprises means within the head for releasably holding a cutting tip.

6. A method of manufacturing a turning tool comprising a tool body for holding a cutting tip, comprising the steps of prefabricating a shank having a concave cylindrical end face extending over an arc of not more than 180° whose radius is substantially equal to one-half the width of the shank and whose height is equal to the height of the shank, prefabricating a cutting tip-holding head having a convex cylindrical rear end face of the same radius as said concave face, and having a width equal to twice said radius and a height equal to the height of said convex surface, and integrally bonding the convex end face of the head at a selected orientation in the concave end face of the shank, the only contact between the head and the shank being at said bonded end faces.

7. A method according to claim 6 wherein the head comprises means within the head for releasably holding a cutting tip.

8. A method of manufacturing a turning tool comprising a tool body for holding a cutting tip, comprising the steps of prefabricating a shank having an end face which comprises a concave cylindrical surface extending over an arc of not more than 180° whose radius is substantially equal to one-half the width of the shank and whose height is equal to the height of the shank, and which also comprises a flat surface tangent to the cylindrical surface, prefabricating a cutting tip-holding head having a convex cylindrical rear end face of the same radius as said concave cylindrical surface, and having a width equal to twice said radius and a height equal to the height of said convex surface, and integrally bonding the convex end face of the head in said concave cylindrical surface and bonding said flat surface to a side of the head, the only contact between the head and the shank being at said bonded surfaces.

* * * * *